United States Patent
Tanabe et al.

(10) Patent No.: US 10,079,438 B2
(45) Date of Patent: Sep. 18, 2018

(54) RADIO-FREQUENCY ENERGY TRANSFERS OR HARVESTING BASED ON COMBINING DIRECT CURRENT SIGNALS FROM MULTIPLE ANTENNAS

(71) Applicant: NVoLogic Inc, Woodside, CA (US)

(72) Inventors: Yuji Tanabe, Cupertino, CA (US); Ada Shuk Yan Poon, Redwood City, CA (US); Siu-Weng Simon Wong, Woodside, CA (US)

(73) Assignee: NVoLogic Inc, Woodside, CA (US)

( * ) Notice: Subject to any disclaimer, the term of this patent is extended or adjusted under 35 U.S.C. 154(b) by 9 days.

(21) Appl. No.: 15/271,547

(22) Filed: Sep. 21, 2016

(65) Prior Publication Data

US 2018/0083371 A1    Mar. 22, 2018

(51) Int. Cl.
| | | |
|---|---|---|
| H01Q 21/00 | (2006.01) | |
| H02J 1/00 | (2006.01) | |
| H05K 7/14 | (2006.01) | |
| H01G 9/16 | (2006.01) | |
| H01Q 21/29 | (2006.01) | |
| H04B 5/00 | (2006.01) | |
| H01Q 1/00 | (2006.01) | |
| H01Q 1/24 | (2006.01) | |
| H02J 50/00 | (2016.01) | |
| H02M 7/00 | (2006.01) | |

(52) U.S. Cl.
CPC .......... *H01Q 21/293* (2013.01); *H01Q 1/002* (2013.01); *H01Q 1/241* (2013.01); *H04B 5/0037* (2013.01); *H02J 50/00* (2016.02); *H02M 7/00* (2013.01)

(58) Field of Classification Search
CPC .. H02J 17/00; H02J 7/0019; H02J 7/35; H02J 50/20; H02M 5/4505; H02M 5/4585; H02M 2001/4283; Y02B 70/1441
See application file for complete search history.

(56) References Cited

U.S. PATENT DOCUMENTS

| | | | |
|---|---|---|---|
| 6,243,013 | B1 | 6/2001 | Duan |
| 7,084,605 | B2 | 8/2006 | Mickle |
| 7,528,698 | B2 | 5/2009 | Mickle |
| 2009/0207000 | A1* | 8/2009 | Mickle ............... G06K 19/0707 340/10.34 |

(Continued)

OTHER PUBLICATIONS

Ugur Olgun, Investigation of Rectenna Array Configurations for Enhanced RF Power Harvesting, IEEE Antennas and Wireless Propagation Letters, vol. 10, 2011, 262-265.

(Continued)

*Primary Examiner* — Dameon E Levi
*Assistant Examiner* — Ricardo Magallanes
(74) *Attorney, Agent, or Firm* — Lumen Patent Firm (57) ABSTRACT

A radio-frequency power receiving device has RF antennas connected to multiple controllable rectifying circuits to produce corresponding DC signals which are combined in a controllable switching network to produce a combined DC output. A control unit determines an amplitude control signal that controls each rectifying circuit and also determines switch control signals that control a switching network. The switching network controllably combines the direct-current signals to combine the multiple corresponding direct-current signals in series, in parallel, or in a combination of series and parallel.

6 Claims, 10 Drawing Sheets

(56) References Cited

U.S. PATENT DOCUMENTS

2011/0175461 A1\* 7/2011 Tinaphong .............. H02J 17/00
307/149
2012/0293009 A1\* 11/2012 Kim .................... H02H 7/1252
307/104
2014/0268964 A1 9/2014 Xia

OTHER PUBLICATIONS

Alessandro Bertacchini et al, Reconfigurable RF Energy Harvester with Customized Differential PCB Antenna, J. Low Power Electron. Appl. 2015, 5(4), 257-273.
Aaron N. Parks, Active power summation for efficient multiband RF energy harvesting, 2015 IEEE MTT-S International Microwave Symposium, May 17-22, 2015. 1-4.
Zoya Popović, Scalable RF Energy Harvesting, IEEE Transactions on Microwave Theory and Techniques, vol. 62, No. 4, Apr. 2014, 1046.
Dickson, J. F. "On-chip high-voltage generation in MNOS integrated circuits using an improved voltage multiplier technique." IEEE ournal of Solid State Circuits 11, 374-378 (1976).
Triet Le et al., IEEE Journal of Solid-State Circuits, vol. 43, No. 5, May 2008.
Gomes de Freitas et al., "Multipulse Power Rectifier without Using Multiphase Transformers" Industrial Electronics Society, 2005. IECON 2005. 31st Annual Conference of IEEE.

\* cited by examiner

RADIO-FREQUENCY ENERGY TRANSFERS OR HARVESTING BASED ON COMBINING DIRECT CURRENT SIGNALS FROM MULTIPLE ANTENNAS

FIELD OF THE INVENTION

The invention generally relates to radio-frequency energy transfer or harvesting. More specifically, it relates to radio-frequency energy harvesting by combining direct current signals from multiple antennas.

BACKGROUND OF THE INVENTION

Radio-frequency energy transfer systems are mostly based on inductive or far-field coupling. Both coupling techniques are sensitive to the orientation and misalignment of the receive antenna. In inductive coupling, circuit techniques have been invented to make the mutual coupling less sensitive to the displacement and tilting of the receive antenna. In far-field coupling, the use of circularly polarized antenna is a solution but the efficiency is reduced.

Multiple antennas have been used in wireless communications. Signals from multiple received antennas are coherently combined at radio frequency (RF). This reduces the noise power and hence increases the signal-to-noise ratio for better communication. However, this technique is not effective for energy transfer or harvesting because this reduces the receiving angle. There is a higher probability that the transmitter and the receiver are not aligned, and the energy transfer efficiency is degraded.

SUMMARY OF THE INVENTION

Herein, we disclose a radio-frequency energy transfer or harvesting device. It uses multiple antennas operating at the same frequency to improve the energy transfer efficiency.

In one aspect, the invention provides a radio-frequency power receiving device including multiple RF antennas having a common resonant operating frequency, multiple controllable rectifying circuits connected to the multiple RF antennas in a one-to-one correspondence, a controllable switching network connected to the multiple controllable rectifying circuits, and a control unit connected to the multiple controllable rectifying circuits and connected to the controllable switching network. Each one of the controllable rectifying circuits converts an RF signal from a corresponding one of the RF antennas into a corresponding direct-current signal based on an amplitude control signal, producing multiple direct-current signals in one-to-one correspondence with the multiple RF antennas. The switching network controllably combines the multiple corresponding direct-current signals to produce a combined direct-current output signal. The control unit i) sends to the multiple controllable rectifying circuits multiple amplitude control signals derived from direct current amplitude signals received from the multiple controllable rectifying circuits, and ii) sends to the controllable switching network switch control signals derived from direct current amplitude signals received from the multiple controllable rectifying circuits.

The controllable switching network is preferably adapted to controllably combine the multiple corresponding direct-current signals in series, in parallel, and in a combination of series and parallel. More specifically, the controllable switching network is preferably adapted to controllably combine the multiple corresponding direct-current signals such that a subset of the direct current signals that are above a predetermined threshold are combined in parallel with each other and with direct current signals produced by combining in series subsets of direct-current signals that are below the predetermined threshold.

The multiple antennas may include a dipole antenna, meander antenna, loaded meander antenna, spiral antenna, bow-tie antenna, loop antenna, meandered loop antenna, folded dipole antenna, slot antenna, or patch antenna. The multiple antennas may be placed orthogonal to each other and/or in an array, and they may be printed on a flexible substrate.

DETAILED DESCRIPTION

Figure 1A:
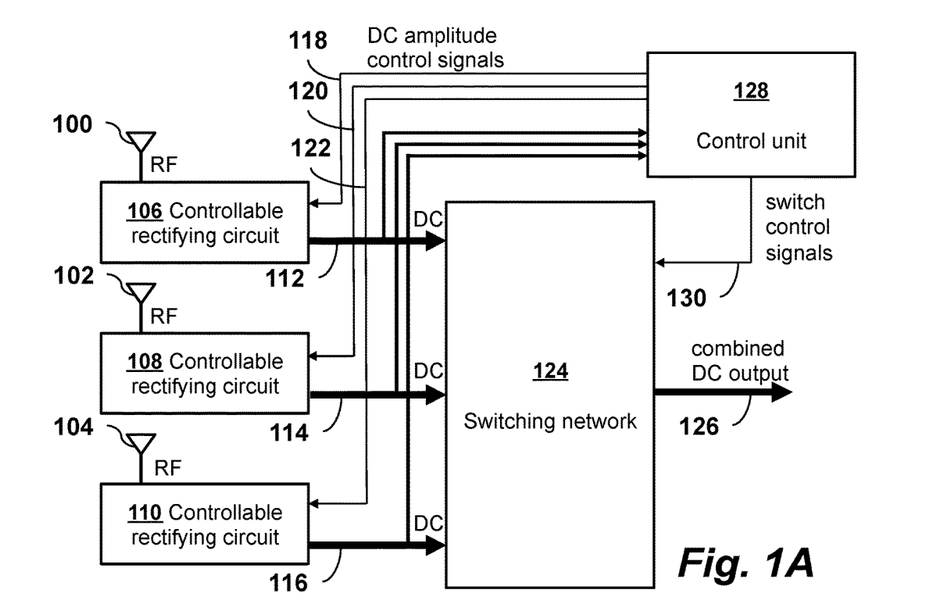
FIG. 1A is a block diagram of an RF energy harvesting device according to an embodiment of the invention.

FIG. 1A is a block diagram of an RF energy harvesting device according to an embodiment of the invention. The device includes multiple RF antennas 100, 102, 104, each tuned to resonate at a resonant frequency within a small tolerance, e.g., 10% of a central operating frequency. The preferred size of each antenna depends on the center frequency and application, and typically is in the range between 1 cm to 20 cm. The antennas may have various geometric layouts, as will be described in detail later. The antennas may be composed of copper on insulator, e.g., circuit board.

Each one of the antennas 100, 102, 104 connects to each one of multiple controllable rectifying circuits 106, 108, 110. Each one of the rectifying circuits produces each of multiple corresponding DC outputs 112, 114, 116. The typical DC voltage of each of the outputs is on the order of 100 mV. Each of the rectifying circuits 106, 108, 110 has an independently controllable amplitude gain that is controlled by each of multiple DC amplitude control signals 118, 120, 122. Thus, there is a one-to-one correspondence between RF antennas 100, 102, 104, corresponding rectifying circuits 106, 108, 110, corresponding DC outputs 112, 114, 116, and corresponding DC amplitude control signals 118, 120, 122. Although this embodiment shows for the purposes of illustration a device with three parallel rectifying circuits, each having a single antenna, rectifier, DC output, and DC amplitude control signal, it is understood that the device may have any plural number of such parallel rectifying circuits. In general, the number of parallel rectifying circuits will depend on the physical size allowed by the application. Preferably, there are two to eight or more rectifying circuits.

The DC outputs 112, 114, 116 of the rectifying circuits 106, 108, 110 all connect to a switching network 124 that combines the DC outputs 112, 114, 116 to produce a single combined DC output 126. In general, the switching network 124 can be controllably configured to combine the DC outputs 112, 114, 116 in any possible way to optimize the final output voltage and current, e.g., combine all in series, combine all in parallel, or combine a subset combined in series with a subset combined in parallel. In some embodiments designed for specific applications, however, the switching network 124 may have a simpler design that does not necessarily allow for all possible combinations of the DC signals.

A control unit 128 receives the DC outputs 112, 114, 116 of the rectifying circuits 106, 108, 110 and both generates the DC amplitude control signals 118, 120, 122 sent to the rectifying circuits 106, 108, 110 to control their gains as well as generates switch control signals 130 sent to the switching network 124 to control how the DC output signals 112, 114, 116 are combined to produce DC output 126. In a preferred implementation, the rectifiers 106, 108, 110, switching network 124, control unit 128, and their connections are realized as part of a single integrated circuit connected to the multiple antennas 100, 102, 104. However, they can also be realized as a combination of separate integrated circuits, appropriately connected externally to each other and to the antennas.

In a preferred embodiment, the control unit 128 determines each of the DC amplitude control signals 118, 120, 122 based on the corresponding one of the DC outputs 112, 114, 116 and a predetermined threshold value, as follows. The control unit 128 compares a give rectified DC output to the predetermined threshold value, which is set by the design application. If the DC output is below the corresponding threshold value, the control unit 128 generates a corresponding DC amplitude control signal that is sent to the corresponding rectifying circuit to amplify the rectified output. The control unit 128 increases the amplification until the rectified DC output reaches or exceeds the predetermined threshold value. The predetermined threshold value is selected based on the specific application, e.g., a chip supply voltage of 1 V. In practice, this threshold is usually fixed for a specific application.

In a preferred embodiment, the control unit 128 determines the switch control signals 130 based on the DC outputs 112, 114, 116, as follows. Any DC outputs that are above the threshold are combined in parallel. Any DC outputs that are below a predetermined minimum value are discarded. The remaining DC outputs are optimally combined as follows. Multiple DC outputs are selected and combined in series such that their combined series amplitude is above the predetermined threshold. If other DC outputs still remain, they are likewise selected and combined in series such that their combined series amplitude is above the predetermined threshold. This is repeated until all DC outputs are selected. The resulting series outputs are then combined in parallel with the original DC outputs above the threshold that were combined in parallel. In this manner, amplified DC outputs from different antennas are combined in the switching network 124 to optimize the output current while maintaining a minimum threshold voltage. All these parallel and series connections are configured by the switching network 124, and the switch patterns are controlled by the control unit 128.

Figure 1B:
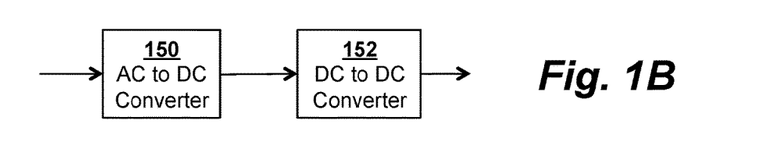
FIG. 1B shows an embodiment of the rectifying circuit with controllable amplitude gain, according to an embodiment of the invention.
Figure 1C:
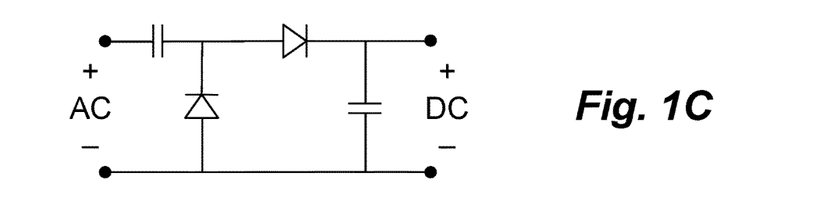
FIG. 1C is a schematic circuit diagram illustrating an AC to DC converter according to an embodiment of the invention.

FIG. 1B shows an embodiment of the rectifying circuit with controllable amplitude gain. It is composed of an AC to DC converter 150 connected in series with a DC to DC converter 152 providing controllable amplification. The DC-to-DC conversion ratio is controlled by an amplitude control signal. The AC to DC converter might be a rectifying circuit implemented with diode and capacitor as shown in FIG. 1C. The DC-to-DC converter might be a charge pump circuit implemented with diodes and capacitors, or transistors and capacitors, such as taught in Dickson, J. F. "On-chip high-voltage generation in MNOS integrated circuits using an improved voltage multiplier technique." *IEEE Journal of Solid State Circuits* 11, 374-378 (1976).

Figure 2A:
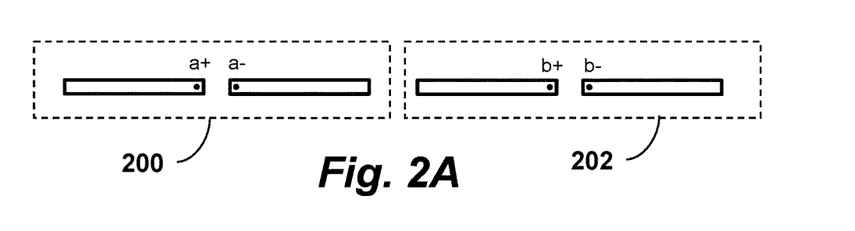
FIG. 2A is a schematic illustration of two dipole antennas, according to an embodiment of the invention.
Figure 2B:
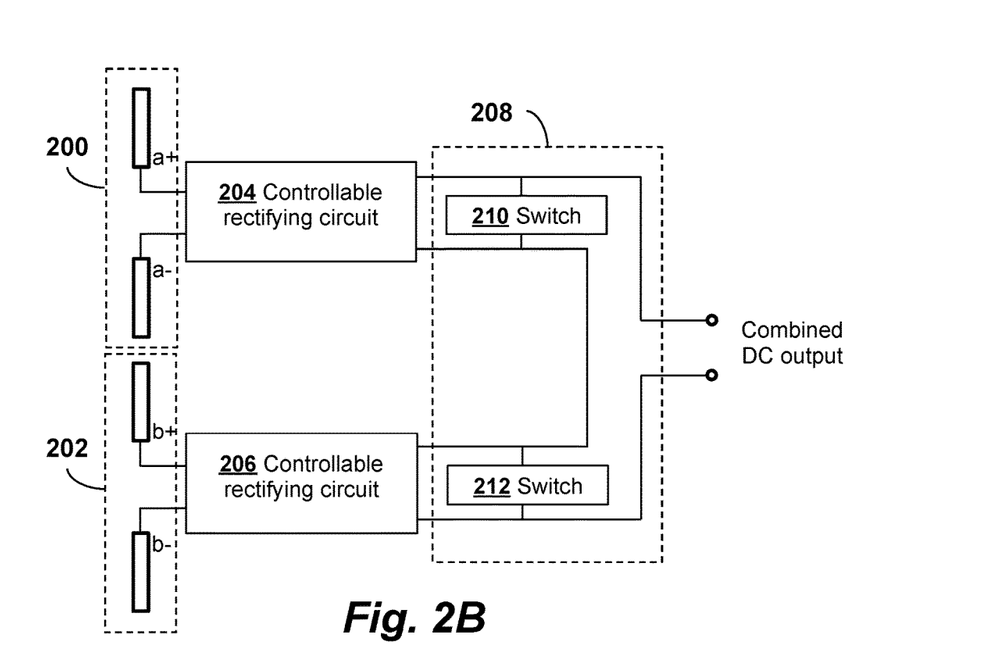
FIG. 2B is a schematic block diagram illustrating a simple embodiment of the invention having two dipole antennas, where the DC signals are combined in series.

FIG. 2B is a schematic block diagram illustrating a simple embodiment of the invention. It includes two dipole antennas, $a^+a^-$ and $b^+b^-$ as shown in FIG. 2A as 200 and 202. Each of the two antennas 200, 202 is connected to each of a pair of controllable rectifying circuits 204, 206, as shown in FIG. 2B. Each of the rectifying circuits converts the alternating current (AC) signal received by the corresponding antenna to a direct current (DC) signal. The rectifying circuit is controlled by a controller (not shown) to increase the DC signal if it is below the predetermined threshold. The rectified DC signals are connected to a switching network 208 that combines them in series as the combined DC output. The switching network includes two switches 210, 212. A switch is activated by the controller (not shown) if the rectified DC signal is below a minimum value, in which case the DC signal is discarded and not combined in series with the other DC signal.

The receiving pattern of a dipole antenna has a 3-dB beamwidth of 78°. If RF signals from two dipole antennas are combined, the receiving angle will decrease to about 47.8°. There is a higher probability that the transmitter is not in the direction of the receiving antennas. In this case, the power transfer efficiency will be low.

In embodiments of the invention, the signals are combined in DC, not RF. Hence, the 3-dB beamwidth remains the same as that of a dipole antenna. Furthermore, the effective aperture area increases, and as a result, the power transfer efficiency almost doubles. The DC signal from each antenna is adjusted by the controllable rectifying circuit before they are combined to achieve the most optimum energy transfer.

Figure 3:
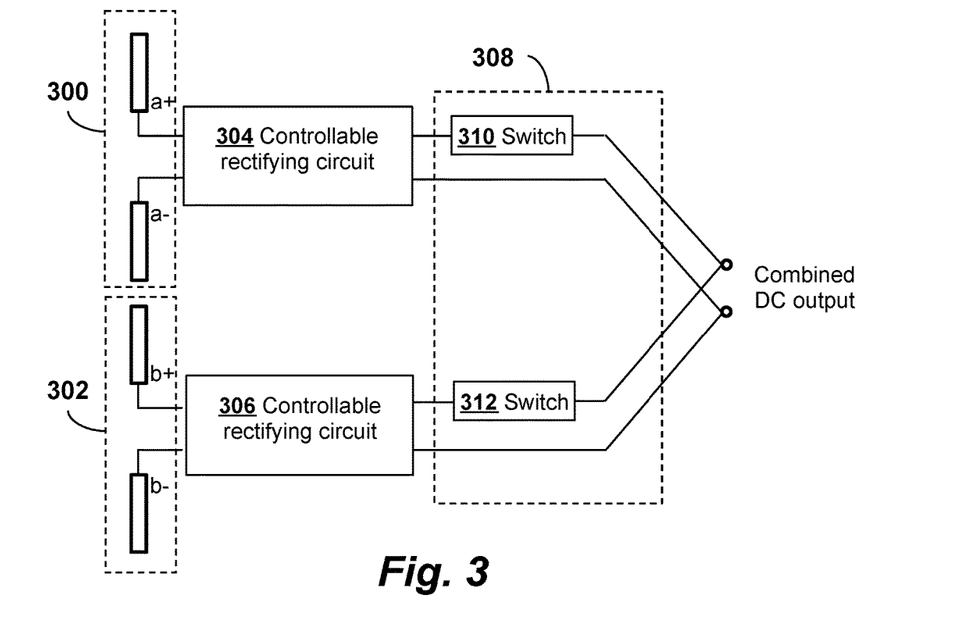
FIG. 3 is a schematic block diagram illustrating another simple embodiment of this invention having two dipole antennas, where the DC signals are combined in parallel.

FIG. 3 is a schematic block diagram illustrating another simple embodiment of this invention. As in the embodiment of FIG. 2B, this embodiment has two dipole antennas 300, 302 connected to two respective controllable rectifiers 304, 306 whose DC outputs are combined in a switching network 308 to produce a combined DC output. In this embodiment, however, the rectified DC signals are connected in parallel instead of in series. The switching network 308 has two switches 310, 312 that are controlled by a controller (not shown) based on the rectified DC output values. A switch is set to open if the corresponding rectified DC signal is too low, resulting in the low DC signal not being combined in parallel with the other DC signal. This embodiment increases the final output current while the configuration in FIG. 2B increases the final output voltage.

Figure 4:
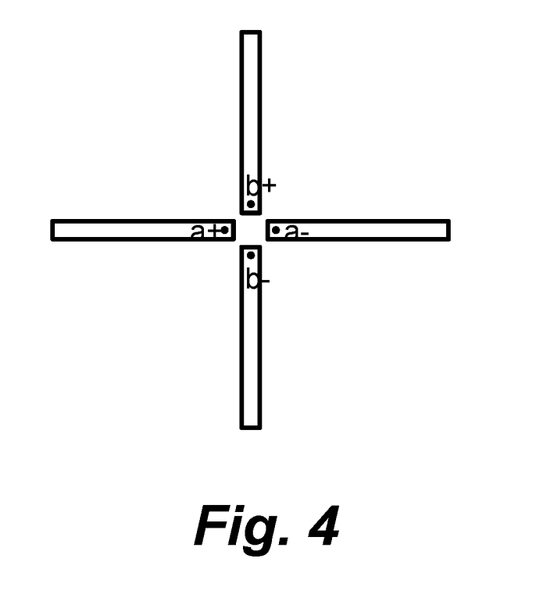
FIG. 4 is a schematic diagram illustrating an orthogonal antenna configuration according to another embodiment of this invention.

FIG. 4 is a schematic diagram illustrating an antenna configuration according to another embodiment of this invention. The two dipole antennas are oriented perpendicular to each other. The polarization of the incident RF signal mostly does not align with the dipoles, and forms an angle θ with one of them and 90°−θ with the other. If θ is small, the signal on one of the dipole will be high while the other will be low. When θ is around 45°, the two dipoles produce similar signals. With the series configuration shown in FIG. 2B, the total final output power remains roughly the same at all θ.

Figure 5:
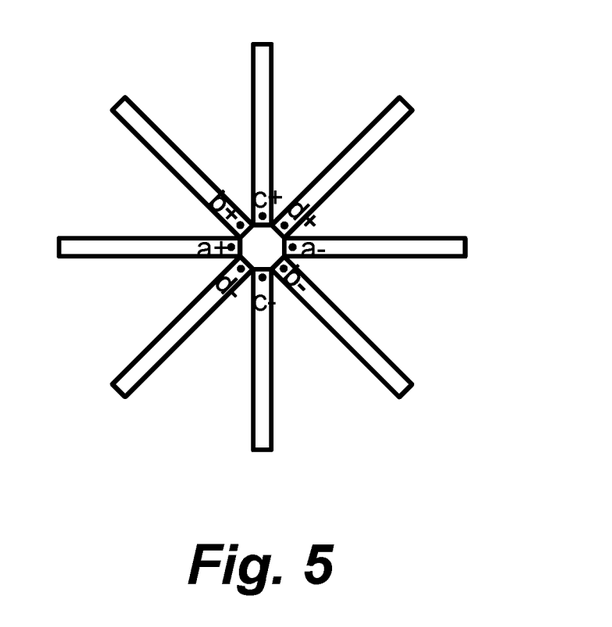
FIG. 5 is a schematic diagram illustrating an asterisk-shaped antenna configuration according to another embodiment of this invention.

FIG. 5 is a schematic diagram illustrating an antenna configuration according to another embodiment of this invention. In this configuration, four dipole antennas, two sets of orthogonal dipole antennas, are arranged in an asterisk shape. In one embodiment, the rectified DC signals of each pair of orthogonal dipole antennas are combined in series to minimize the variation with polarization angle θ. The serial combined DC signals from the two sets of orthogonal dipole antennas are then combined in parallel to maximize the final DC output power. This can be accomplished with the general purpose switching network 124 of FIG. 1A, or with a hard wired switching network.

Figure 6:
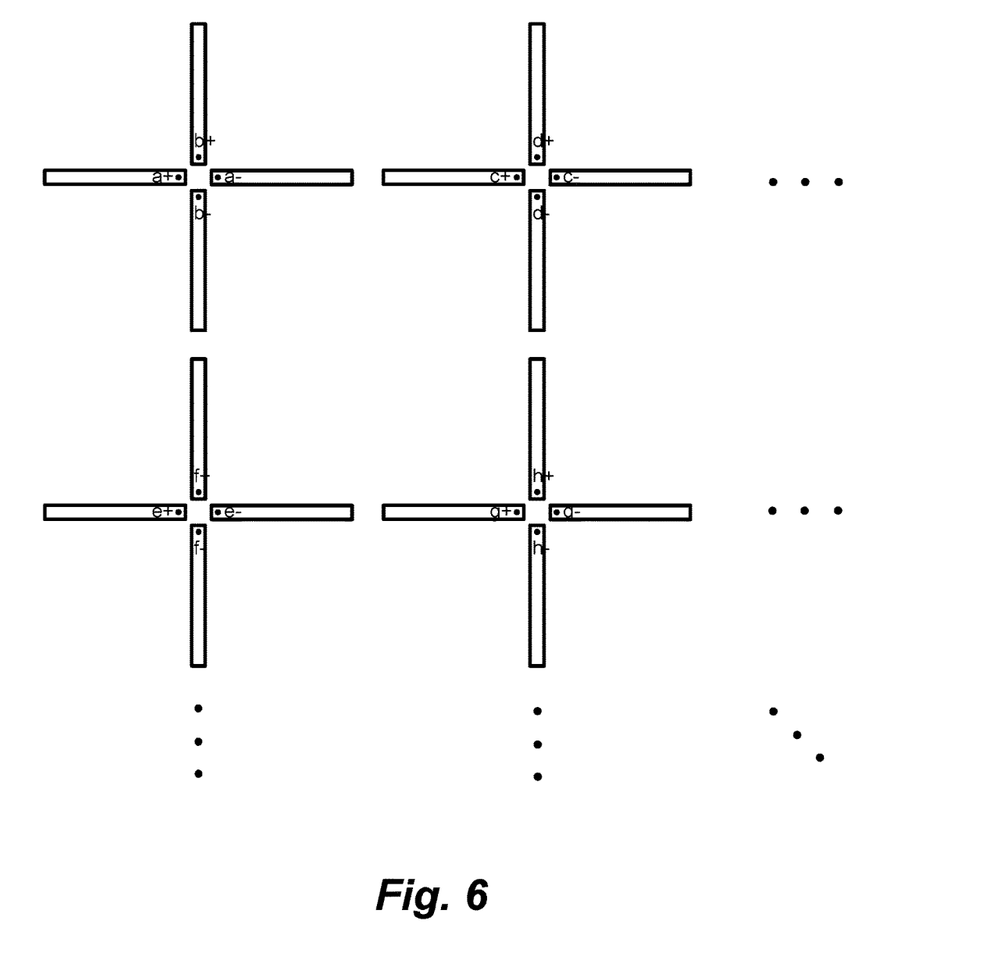
FIG. 6 is a schematic diagram illustrating an antenna configuration according to another embodiment of this invention, in which multiple pairs of orthogonal dipoles antennas that are placed end-to-end in an array format.

FIG. 6 is a schematic diagram illustrating an antenna configuration according to another embodiment of this invention. Pairs of orthogonal dipoles are placed end-to-end in an array format. In one embodiment, the rectified DC signals of each pair of orthogonal dipole antennas are combined in series to minimize the variation with polarization angle θ. The serial combined DC signals from the multiple sets of orthogonal dipole antennas are then combined in parallel to maximize the final DC output power. This can be accomplished with the general purpose switching network 124 of FIG. 1A, or with a hard wired switching network.

Figure 7:
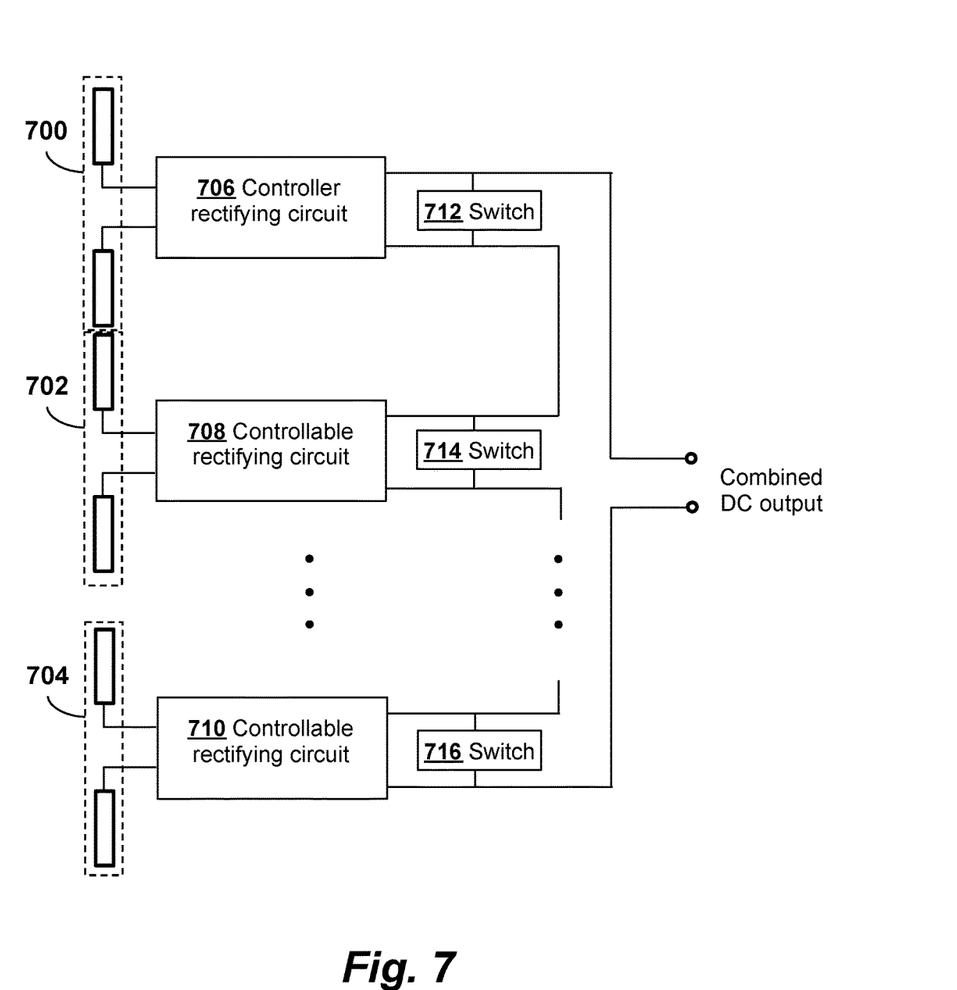
FIG. 7 is a schematic block diagram illustrating a device for use with multiple antennas where the rectified signals are combined in series, according to an embodiment of the invention.

FIG. 7 is a schematic block diagram illustrating a device for use with multiple antennas arranged as shown in FIGS. 5-6, according to an embodiment of the invention. Each antenna 700, 702, 704 is connected to a controllable rectifying circuit 706, 708, 710 and a switch 712, 714, 716, respectively. The rectified signals are connected in series, generalizing the embodiment shown in FIG. 2B. This configuration is designed to yield increased output voltage.

Figure 8:
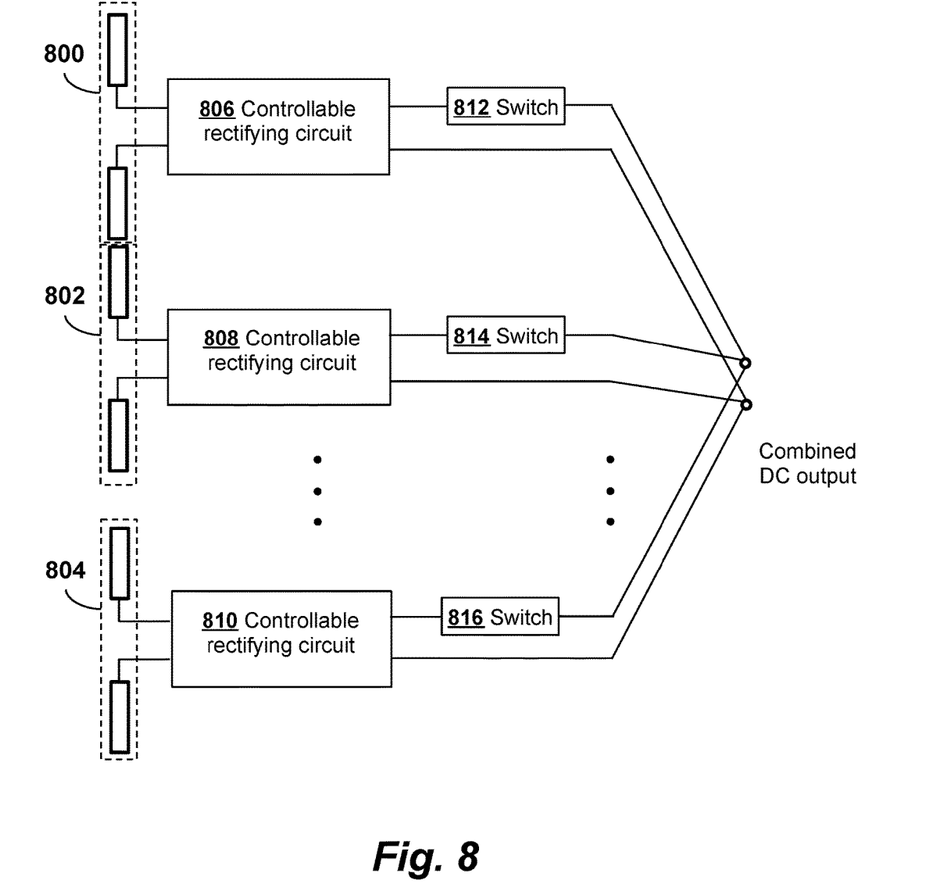
FIG. 8 is a schematic block diagram illustrating a device for use with multiple antennas where the rectified signals are combined in parallel, according to an embodiment of the invention.

FIG. 8 is a schematic block diagram illustrating a device for use with multiple antennas arranged as shown in FIGS. 5-6, according to an embodiment of the invention. Each antenna 800, 802, 804 is connected to a controllable rectifying circuit 806, 808, 810 and a switch 812, 814, 816, respectively. The rectified signals are connected in parallel, generalizing the embodiment shown in FIG. 3. This configuration is designed to yield increased output current.

Figure 9:
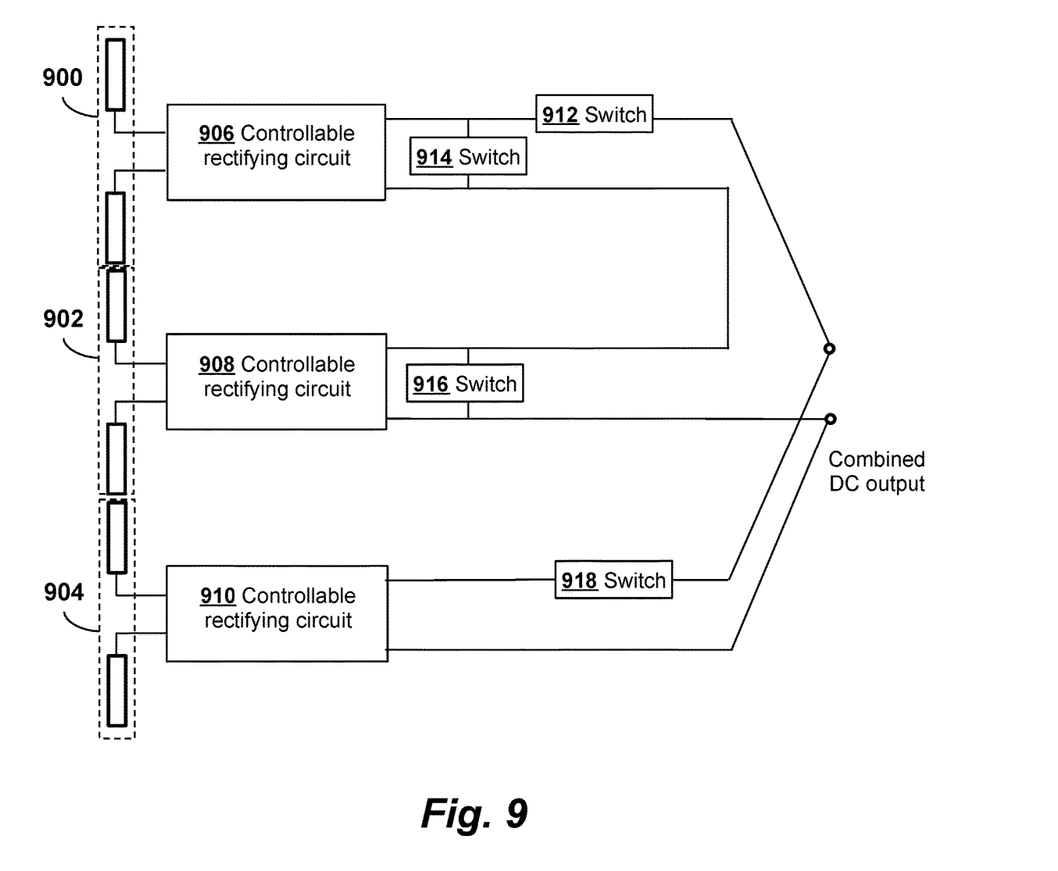
FIG. 9 is a schematic block diagram illustrating a device for use with multiple antennas where the rectified signals are connected in a combination of parallel and series connections, according to an embodiment of the invention.

FIG. 9 is a schematic block diagram illustrating a device for use with multiple antennas arranged as shown in FIGS. 5-6, according to an embodiment of the invention. Each antenna 900, 902, 904 is connected to a controllable rectifying circuit 906, 908, 910, respectively. In addition, switches 912, 914, 916, 918 form a switching network that may be controlled to determine whether or not a DC output is included in the combined DC output. The rectified signals in this embodiment are connected in a combination of parallel and series connections to optimize the output voltage and current. If switch 914 or 916 is activated (closed), the corresponding DC signal from 906 or 908 will be discarded. If switch 918 is de-activated (open), the DC signal from 910 will be discarded. If switch 912 is de-activated (open), the serially combined DC signals of 906 and 908 will be discarded.

Figure 10:
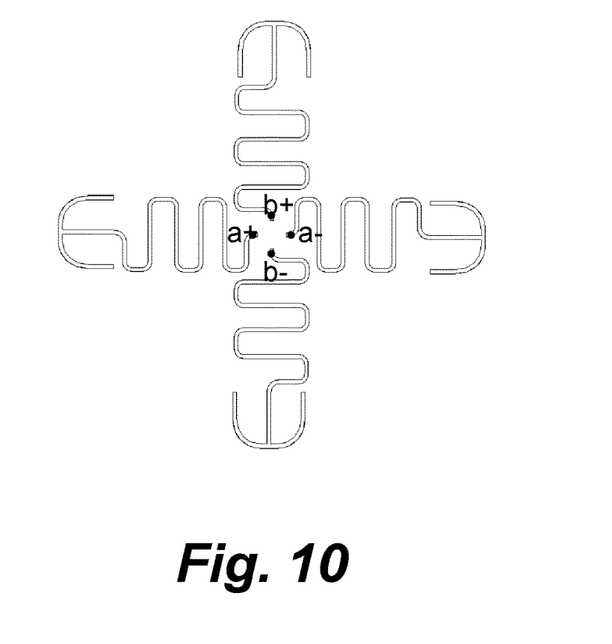
FIG. 10 is a schematic diagram illustrating two slim meander antennas that are oriented perpendicular to each other, according to another embodiment of this invention.

FIG. 10 is a schematic diagram illustrating an antenna configuration according to another embodiment of this invention. Two meander dipole antennas are oriented perpendicular to each other. Each antenna is ended with a T shape for impedance matching. This arrangement miniaturizes the receiver without sacrificing the efficiency. The rectified DC signals of the two dipole antennas are preferably combined in series to minimize the variation with polarization angle θ.

Figure 11:
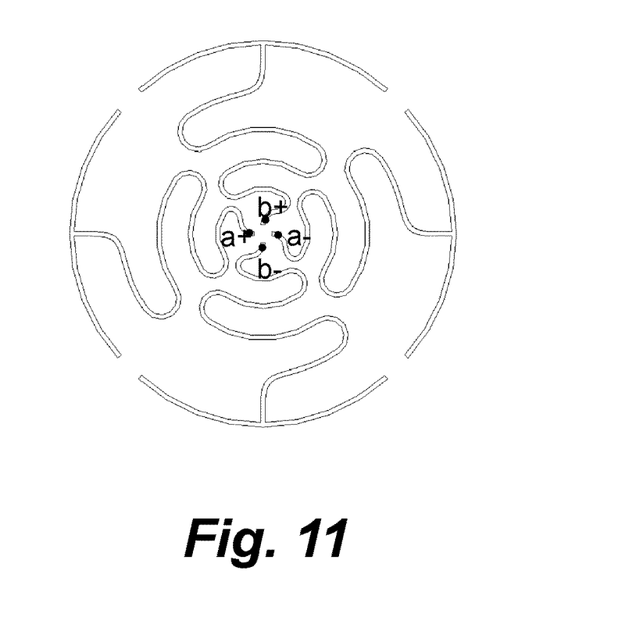
FIG. 11 is a schematic diagram illustrating two meandered antennas that are oriented perpendicular to each other, according to an embodiment of this invention.
Figure 12:
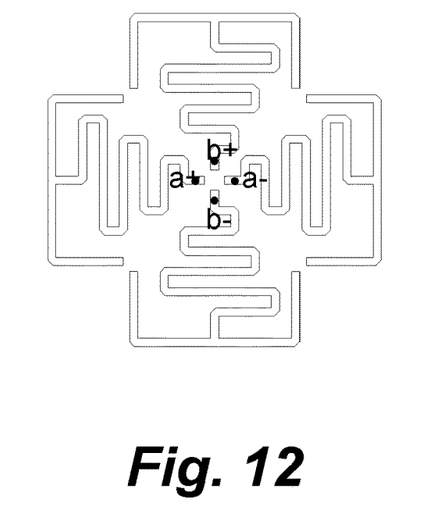
FIG. 12 is a schematic diagram illustrating two meandered antennas that are oriented perpendicular to each other, according to an embodiment of this invention.

FIG. 11 and FIG. 12 are schematic diagrams illustrating antenna configurations according to embodiments of this invention. Two meander dipole antennas are oriented perpendicular to each other. The meander antenna has a diverging shape. This further minimizes the space occupied. The rectified DC signals of the two dipole antennas are preferably combined in series to minimize the variation with polarization angle θ.

Figure 13:
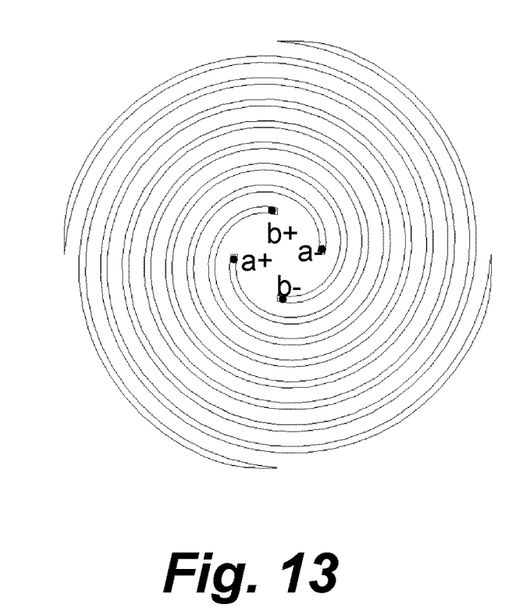
FIG. 13 is a schematic diagram illustrating four spiral elements forming two dipole antennas that are oriented perpendicular to each other, according to another embodiment of this invention.

FIG. 13 is a schematic diagram illustrating an antenna configuration according to another embodiment of this invention. It consists of four spiral elements forming two dipole antennas that are oriented perpendicular to each other. Spiral structure is inherently broadband. This is a broadband variation of the embodiment shown in FIG. 4. The rectified DC signals of the two spiral dipole antennas are preferably combined in series to minimize the variation with polarization angle θ.

Although various specific antennas are illustrated in embodiments above, in general, any type of antenna can be used in embodiments of this invention. Also, the antennas shown in FIGS. 4-5 and FIG. 10-13, as well as other antenna types, could be elements in the antenna array shown in FIG. 6.

The antennas can be printed on a flexible substrate such as ultrathin FR4 and PET film, and wrapped around an object. The object might house the electronics and rechargeable battery.

The device is preferably self-powered by the RF energy that it harvests, so that no external power source is required for operation.

The invention claimed is:

1. A radio-frequency power receiving device comprising:
    multiple RF antennas having a common resonant operating frequency;
    multiple controllable rectifying circuits connected to the multiple RF antennas in a one-to-one correspondence, wherein each one of the controllable rectifying circuits converts an RF signal from a corresponding one of the RF antennas into a corresponding direct-current signal based on an amplitude control signal, producing multiple direct-current signals in one-to-one correspondence with the multiple RF antennas;

a controllable switching network connected to the multiple controllable rectifying circuits, wherein the switching network controllably combines the multiple corresponding direct-current signals based on switch control signals to produce a combined direct-current output signal; and a control unit connected to the multiple controllable rectifying circuits and connected to the controllable switching network, wherein the control unit i) sends to the multiple controllable rectifying circuits multiple amplitude control signals to control amplitude gains of the rectifying circuits, wherein the amplitude control signals are derived from direct current amplitude signals received from the multiple controllable rectifying circuits, and ii) sends to the controllable switching network the switch control signals, wherein the switch control signals are derived from direct current amplitude signals received from the multiple controllable rectifying circuits.

2. The radio-frequency power receiving device of claim 1 wherein the controllable switching network is adapted to controllably combine the multiple corresponding direct-current signals in series, in parallel, and in a combination of series and parallel.

3. The radio-frequency power receiving device of claim 1 wherein the controllable switching network is adapted to controllably combine the multiple corresponding direct-current signals such that a subset of the direct current signals that are above a predetermined threshold are combined in parallel with each other and with direct current signals produced by combining in series subsets of direct-current signals that are below the predetermined threshold.

4. The radio-frequency power receiving device of claim 1 wherein said multiple antennas comprise a dipole antenna, meander antenna, loaded meander antenna, spiral antenna, bow-tie antenna, loop antenna, meandered loop antenna, folded dipole antenna, slot antenna, or patch antenna.

5. The radio-frequency power receiving device of claim 1 wherein said multiple antennas are placed orthogonal to each other.

6. The radio-frequency power receiving device of claim 1 wherein said multiple antennas are arranged in an array.

* * * * *